Beneditt Sauter's Improved Refrigerator.

104209 PATENTED JUN 14 1870

Witnesses
Granville White
Nelson L. White

Beneditt Sauter — Inventor

United States Patent Office.

BENEDITT SAUTER, OF DANBURY, CONNECTICUT.

Letters Patent No. 104,209, dated June 14, 1870.

IMPROVED REFRIGERATOR.

The Schedule referred to in these Letters Patent and making part of the same.

I, BENEDITT SAUTER, of Danbury, in the county of Fairfield and State of Connecticut, have invented certain Improvements in Refrigerators or Cooling-Boxes, of which the following is a specification.

My invention consists in causing a constant and strong current of pure air to flow through the refrigerator or cooling-box, by means of a bellows, worked by a clock arrangement, as shown in the accompanying drawing, of which—

Figure 1:
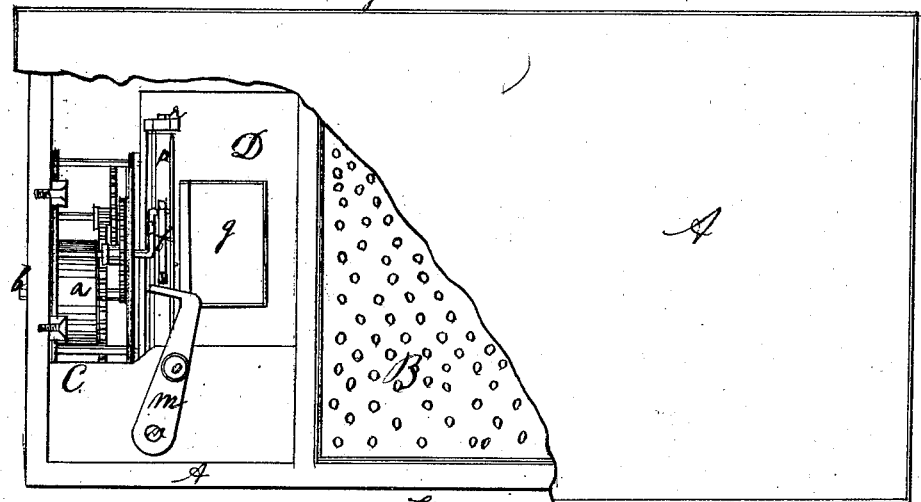
Figure 1 is a view the inside from above, with a part of the top removed, to show the several parts.
Figure 2:
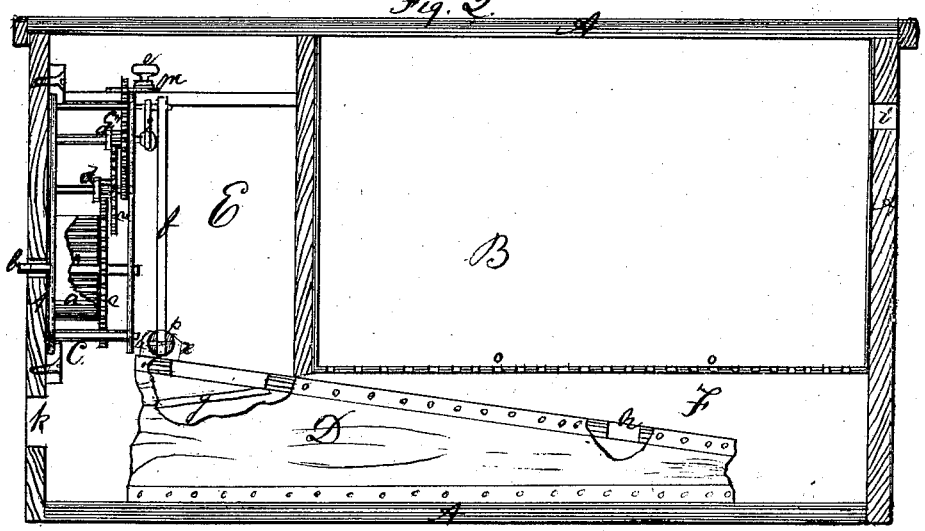
Figure 2 is a transverse section, showing the parts more fully, and the operation of the several parts.

A is the cooling-box or refrigerator.

B is a metal-lined sap-chamber, with numerous perforations in the bottom, to permit the fresh air to be forced freely through it.

C is a clock-work, with its main spring $a$, winding part $b$, gear-wheels $c$ $c'$ $c''$, and their complementary pinions $d$ $d'$ $d''$, the last of which has a crank-shaft, $e$, and is attached to the bellows D by the pitman $f$.

The clock-work C is placed in the chamber E at the end of the box A.

The bellows D extends from the chamber E into the chamber F, under the metal-lined sap-chamber B, and, when worked by the clock-work C through pitman $f$, receives the fresh air from the chamber E through the valve $g$, and forces it, in a strong current, through the hole $h$, in the top of the bellows D, into the chamber F, and thence through the holes in the bottom of the chamber B, and from which it passes out of the box A, through holes, near the top, one of which is shown at $i$.

$k$ is one of several holes in the box A, to admit pure air into the chamber E to supply or feed the bellows D.

The pitman $f$ is fastened to the bellows D by means of the slotted roller $p$, whose bearings $r$ $r$ are fastened to the top of the bellows D, the pitman $f$ passing through the slot in the roller $p$, and fastened to it with the pin $n$.

Near the top of the clock-work C is a stop or catch, $m$, pivoted at $n$, with a knob, $o$, by which it is brought into contact with the gear-wheel $c''$, to stop the clock-work C when desirable.

Now, by winding the clock-work C, and releasing the gear-wheel $c''$ from the catch $m$, the clock C moves the crank-shaft $e$ and the bellows D through the pitman $f$, till it requires to be wound again, which may be twelve hours or a week, as desirable.

By this method a much stronger current of air, and a cooler box by several degrees, is produced than can be done with a fan-blower, with the same power, and many articles are kept much better, even without ice than in the close ice-boxes now in common use, as they require a constant supply of pure air more than extreme cold, and if desirable, both can be combined in the same box.

What I claim as my invention, and desire to secure by Letters Patent, is—

The clock-work C, bellows D, having valve $g$, and aperture $h$, chamber F, with inlets $k$, in combination with the metal-lined cooling-chamber B, with apertures $o$ in the bottom, and exit apertures $i$ near the top, constructed and arranged to operate in the manner and for the purposes described.

BENEDITT SAUTER.

Witnesses:
    GRANVILLE WHITE,
    NELSON L. WHITE.